US008771829B2

(12) United States Patent
Maas et al.

(10) Patent No.: US 8,771,829 B2
(45) Date of Patent: *Jul. 8, 2014

(54) FLAME RETARDANT THERMOPLASTIC POLYMER COMPOSITION, METHOD OF MANUFACTURE, AND ARTICLES FORMED THEREFROM

(75) Inventors: Christianus Johannes Jacobus Maas, Rilland (NL); Hendrik Cornelus Jacobus de Nooijer, Middelburg (NL); Vandita Pai-Paranjape, Evansville, IN (US); Srinivas Siripurapu, Minnetonka, MN (US); Joshua Arie van den Bogerd, Tholen (NL); Andries Adriaan Volkers Volkers, Wouw (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/566,914

(22) Filed: Sep. 25, 2009

(65) Prior Publication Data

US 2010/0075125 A1    Mar. 25, 2010

Related U.S. Application Data

(63) Continuation-in-part of application No. 12/237,408, filed on Sep. 25, 2008.

(51) Int. Cl.
   *B32B 27/36*   (2006.01)
   *B29C 47/00*   (2006.01)

(52) U.S. Cl.
   USPC ........................................ 428/220; 264/176.1

(58) Field of Classification Search
   USPC .................... 524/162; 428/220; 264/176.1
   See application file for complete search history.

(56) References Cited

U.S. PATENT DOCUMENTS

| | | |
|---|---|---|
| 3,775,367 A | 11/1973 | Nouvertne |
| 3,929,908 A | 12/1975 | Orlando et al. |
| 4,026,913 A | 5/1977 | Tanigaichi et al. |
| 4,081,750 A | 3/1978 | Herr et al. |
| 4,092,291 A | 5/1978 | Mark |
| 4,123,436 A | 10/1978 | Holub et al. |
| 4,170,711 A | 10/1979 | Orlando et al. |
| 4,188,475 A | 2/1980 | Margotte |
| 4,231,920 A | 11/1980 | Mark et al. |
| 4,471,104 A | 9/1984 | Krishnan et al. |
| 4,767,810 A | 8/1988 | Nelson |
| 4,824,723 A | 4/1989 | Campbell et al. |
| 4,880,850 A | 11/1989 | Nelson et al. |
| 4,896,922 A | 1/1990 | Güthe |
| 4,918,125 A | 4/1990 | Boutni |
| 4,923,933 A | 5/1990 | Curry |
| 4,933,424 A | 6/1990 | Rosenquist |
| 5,006,572 A | 4/1991 | Lundy et al. |
| 5,118,726 A | 6/1992 | Mizutani et al. |
| 5,126,404 A | 6/1992 | Eckel et al. |
| 5,306,456 A | 4/1994 | Suhadolnik et al. |
| 5,426,170 A | 6/1995 | Hirao et al. |
| 5,486,555 A | 1/1996 | Hirata et al. |
| 5,807,908 A | 9/1998 | Hirose et al. |
| 6,031,036 A | 2/2000 | Rosenquist et al. |
| 6,040,367 A | 3/2000 | Miya et al. |
| 6,297,300 B1 | 10/2001 | Van Nuffel |
| 6,353,046 B1 | 3/2002 | Rosenquist |
| 6,420,512 B1 | 7/2002 | McCloskey et al. |
| 6,433,046 B1 | 8/2002 | Campbell et al. |
| 6,657,018 B1 | 12/2003 | Hoover |
| 6,870,025 B2 | 3/2005 | McCloskey et al. |
| 6,960,641 B2 | 11/2005 | O'Neil et al. |
| 7,652,083 B2 * | 1/2010 | Mullen ..................... 524/108 |
| 7,709,562 B2 * | 5/2010 | Li et al. .................... 524/108 |
| 2002/0115762 A1* | 8/2002 | Chung et al. .............. 524/161 |
| 2003/0211291 A1 | 11/2003 | Castiglione et al. |
| 2004/0014851 A1 | 1/2004 | Dohi |
| 2005/0113535 A1 | 5/2005 | Glasgow et al. |
| 2005/0288407 A1 | 12/2005 | Heuer et al. |
| 2006/0018627 A1 | 1/2006 | Kasai |
| 2006/0078743 A1 | 4/2006 | Champlin et al. |
| 2006/0135736 A1 | 6/2006 | Meyer et al. |
| 2006/0240242 A1* | 10/2006 | Raghavendran et al. .. 428/304.4 |
| 2007/0100059 A1 | 5/2007 | Mullen |
| 2007/0191518 A1 | 8/2007 | Chen et al. |
| 2007/0191519 A1 | 8/2007 | Jiao et al. |

(Continued)

FOREIGN PATENT DOCUMENTS

| | | | |
|---|---|---|---|
| EP | 0272416 A2 | 6/1988 | |
| EP | 0447952 A2 | 9/1991 | |

(Continued)

OTHER PUBLICATIONS

International Search Report for International Application No. PCT/US2009/058391, mailed Dec. 23, 2009, 6 pages.

(Continued)

*Primary Examiner* — John Uselding
(74) *Attorney, Agent, or Firm* — Cantor Colburn LLP

(57) ABSTRACT

A thermoplastic polymer composition comprises a cyanophenyl endcapped polycarbonate, a potassium diphenyl sulphon-3-sulphonate; and brominated polycarbonate. In some embodiments, when the thermoplastic polymer composition is in the form of a 3 mm thick extruded sheet, the sheet has a smoke density of less than 200 at an exposure period of 240 seconds in accordance with the smoke density test as set forth in ASTM E662-06, and has no burning drips on the sheet for a duration of 10 minutes in accordance with the flammability test as set forth in NF-P-92-505.

17 Claims, No Drawings

(56) References Cited

U.S. PATENT DOCUMENTS

| | | |
|---|---|---|
| 2008/0081855 A1 | 4/2008 | Mullen |
| 2008/0081860 A1 | 4/2008 | Li |
| 2008/0081892 A1 | 4/2008 | Di et al. |
| 2010/0280159 A1 | 11/2010 | Maas et al. |

FOREIGN PATENT DOCUMENTS

| | | |
|---|---|---|
| EP | 0507547 A2 | 10/1992 |
| EP | 0522753 A2 | 1/1993 |
| EP | 0525338 A1 | 2/1993 |
| EP | 0640646 A1 | 3/1995 |
| EP | 0753540 A2 | 1/1997 |
| EP | 1221459 A1 | 7/2002 |
| EP | 1464483 A1 | 10/2004 |
| EP | 1859927 A3 | 11/2007 |
| WO | WO0153398 A1 | 7/2001 |
| WO | 2008060714 A3 | 5/2008 |

OTHER PUBLICATIONS

Written Opinion for International Search Report for International Application No. PCT/US2009/058391, mailed Dec. 23, 2009, 5 pages.
Japanese Patent No. 4328156; Date of Publication: Nov. 17, 1992; Abstract Only; 1 page.
Japanese Patent No. 5239331; Date of Publication: Sep. 17, 1993; Abstract Only; 1 page.
Japanese Patent No. 5247197; Date of Publication: Sep. 24, 1993; Abstract Only; 13 pages.
Japanese Patent No. 7082362; Date of Publication: Mar. 28, 1995; Abstract Only; 26 pages.
Japanese Patent No. 7090074; Date of Publication: Apr. 4, 1995; Abstract Only; 30 pages.
Japanese Patent No. 63051429; Date of Publication: Mar. 4, 1988; Abstract Only; 1 page.
Okamoto, "Relationship Between the End-Cap Structure of Polycarbonates and Their Impact Resistance", Polymer, vol. 42, (2001), pp. 8355-8359.
Japanese Patent No. 19920049701; Date of Publication: Mar. 6, 1992; Abstract Only; 1 page.
ASTM D1003-00, Procedure A, Illuminat C; Standard Test Method for Haze and Luminous Transmittance of Transparent Plastics; Published: Jul. 2000.
Huang, S.J. et al, "Polycarbonate Networks and Semi-Interpenetrating Networks From Biphenol-A-Polycarbonate Dicyanates", Poly. Prep. American Chemical Society Div. Polym. Chem., 1992, 33(1); pp. 950-951.
ASTM E662-06; Standard Test Method for Specific Optical Density of Smoke Generated by Solid Materials; Published Aug. 2006; West Conshohocken, PA.
U.S. Appl. No. 12/237,410, filed Sep. 25, 2008; "Flame Retardant Thermoplastic Composition and Articles Formed Therefrom".
Tachikawa, et al., "Development of Polymer Films Containing Tris-(Sulfonyloxy)benzene Analogs for Gamma Rays Detection", Journal of Photopolymer Science and Technology, Vol. 17, No. 1 (2004); pp. 81-86.
French Drip Test NF-P 92-505; Became Aware: Apr. 10, 2008.
Japanese Patent No. 2000-226505; Date of Publication: Aug. 15, 2000; Abstract Only; 2 pages.
14 C.F.R. 25.853, Appendix F, Part 1(a)(1)(ii); Effective Sep. 2, 2003.
International Search Report for PCT/US2007/071318, European Patent Office, mailing date May 15, 2008.
Written Opinion of International Search Report for PCT/US2007/071318, European Patent Office, mailing May 15, 2008.
International Search Report for PCT/US2007/084676, mailing date Mar. 13, 2008, 5 pages.
Written Opinion of International Search Report for PCT/US2007/084676, mailing date Mar. 13, 2008, 6 pages.
Japanese Patent No. 2000-129112; Date of Publication: May 9, 2000; Abstract Only.
Japanese Patent No. 2000-239511; Date of Publication: Sep. 5, 2000; Abstract Only.
Airbus ABD0031, "Fireworthiness Requirements Pressurised Section of Fuselage", Oct. 21, 2002, 51 pages.
French Rate of Flame Spread Test, NF-P 92-504.
Japanese Patent No. 05-239332; Date of Publication: Sep. 17, 1993; English translation of Abstract Only.
Japanese Patent No. 05-239333; Date of Publication: Sep. 17, 1993; English translation of Abstract Only.
Derwent Publications Ltd., Database WPI Week 199343, AN 1993-339819, XP002471575, 1 page.
Japanese Patent No. 05247197 (A); Publication Date: Sep. 24, 1993; Machine Translation; 9 Pages.
U.S. Appl. No. 12/237,408, filed Sep. 25, 2008; "Flame Retardant Thermoplastic Composition and Articles Formed Therefrom".
JP 2000-226505; Publication Date: Aug. 15, 2000 (translation of abstract only).
International Search Report for International Application No. PCT/US2009/058391 mailed Dec. 23, 2009, 6 pages.

* cited by examiner

FLAME RETARDANT THERMOPLASTIC POLYMER COMPOSITION, METHOD OF MANUFACTURE, AND ARTICLES FORMED THEREFROM

CROSS-REFERENCE TO RELATED APPLICATIONS

This application is a continuation-in-part of U.S. patent application Ser. No. 12/237,408 filed Sep. 25, 2008, which is fully incorporated herein by reference.

BACKGROUND

The present disclosure generally relates to thermoplastic polymer compositions, and more particularly, to flame retardant polycarbonate compositions.

Transparent polycarbonate sheets are commonly used in aircraft and other transportation interior applications. The transparent polycarbonate sheets can be used in interior applications, such as partition walls, ceiling panels, cabinet walls, storage compartments, galley surfaces, light panels, and the like. All of these applications have various flame safety requirements that the materials must meet in order to be used in the interior applications. Various requirements have been placed on the flame retardant and smoke-generating properties of the materials used in the construction of these interior panels and parts. Particular requirements include smoke density and flame spread. In the United States, Federal Aviation Regulation (FAR) Part 25.853 lays out the airworthiness standards for aircraft compartment interiors. The safety standards for aircraft and transportation systems used in Europe include a smoke density test specified in FAR 25.5 Appendix F, Part V. Flammability requirements include the "60 seconds test" specified in FAR 25.853(a) and (a-1), or the French flame retardant tests such as, NF-P-92-504 (flame spread) or NF-P-92-505 (drip test). In another example, the aircraft manufacturer Airbus has smoke density and other safety requirements set forth in ABD0031.

Materials that can meet or exceed all the various safety requirements for aircraft interior components are desired by the aircraft industry. In view of the current interior compartment material safety standards, and in anticipation of future more stringent standards, materials that exceed governmental and aircraft manufacturer requirements are sought. Moreover, cost pressures in the industry have directed efforts toward the development of these thermoplastic polycarbonate materials with improved flammability and safety characteristics.

BRIEF SUMMARY

Disclosed herein are flame retardant thermoplastic polymer compositions and articles formed therefrom for use in aircraft and transportation interiors.

In one embodiment, a thermoplastic polymer composition comprises: a cyanophenyl endcapped polycarbonate; an aromatic sulphone sulphonate; and a brominated polycarbonate. In a specific embodiment, the cyanophenyl endcapped polycarbonate is branched. When the thermoplastic polymer composition is in the form of a 3 mm thick extruded sheet, the sheet has a smoke density of less than 200 at an exposure period of 240 seconds in accordance with the smoke density test as set forth in ASTM E662-06, and has no burning drips on the sheet for a duration of 10 minutes in accordance with the flammability test as set forth in NF-P-92-505.

In another embodiment, a thermoplastic polymer composition comprises: 0.01 wt. % to 0.6 wt. % an aromatic sulphone sulphonate; a brominated polycarbonate, in an amount such that the composition comprises 0.26 wt. % to 5.2 wt. % bromine; and a cyanophenyl endcapped polycarbonate. In a specific embodiment, the cyanophenyl endcapped polycarbonate is branched.

The above described and other features are exemplified by the following Figures and detailed description.

DETAILED DESCRIPTION

A flame retardant polycarbonate sheet can comprise halogen additives (e.g., a brominated polycarbonate) in order to pass the French flame spread test (NF-P-92-504), but the sheet emits smoke when burned. The sheet, therefore, can have issues meeting some of the smoke generation standards.

Disclosed herein are thermoplastic polymer compositions that can be employed, for example, in sheets for aircraft or other transportation interiors. The thermoplastic polymer compositions described herein comprise halogenated flame retardants and yet still satisfy both the smoke density and flammability test standards for use in aircraft interiors. Flammability rating and the smoke density standards are conflicting requirements. Not to be limited by theory, it is believed that halogenated flame retardants, such as bromine, are used in the polycarbonate compositions for their effectiveness in improving flame spread properties of the sheet and satisfying the stringent aircraft interior flammability standards. Brominated flame retardant additives, however, cause an increase in smoke when the sheets are ignited. The thermoplastic polymer compositions described herein advantageously utilize a cyanophenyl endcapped polycarbonate with a brominated polycarbonate in combination with an aromatic sulphone sulphonate (e.g., an alkali metal sulphone sulphonate such as a potassium diphenyl sulphon-3-sulphonate) to produce a sheet that satisfies both the flammability and smoke density tests.

The thermoplastic polymer compositions utilize the cyanophenyl endcapped polycarbonate with a brominated polycarbonate in combination with the aromatic sulphone sulphonate in quantities effective to pass the flammability and smoke generation limits set forth for aircraft interior applications. As used herein, a composition achieving the flammability rating means a composition that satisfies at least the French Ministerial NF-P-92-505 test, also known as the French drip test. In pertinent part, the test described therein records the behavior of droplets produced by applying heat to a specimen of the sheet to be tested. A successful test means that no droplets coming from the sheet ignite the cotton underneath. This test has a duration of 10 minutes and uses 4 specimens (70 millimeters (mm) by 70 mm with a minimum weight of 2 grams (g)) supported on a horizontal grid. The ignition source is a horizontal radiator (500 watts (W) radiation intensity) on the specimen that was 30 mm from the radiator (3 watts per square centimeter ($W/cm^2$)). The receptacle for catching droplets is cotton wool located 300 mm below the grid. If the cotton wool ignites, the material fails. For simplicity sake, this test will be referred to as the "drip test" going forward.

Also as used herein, a composition satisfying the smoke generation requirements for aircraft compartment interiors means a composition which satisfies American Society for Testing and Materials (ASTM) standard E662 (2006). This test method uses a photometric scale to measure the density of smoke generated by the material. Sheets satisfying the smoke generation requirements for aircraft interiors have a smoke density of less than 200, in accordance with ASTM E662-06.

Again, for simplicity sake, this test will now be referred to as the "smoke density test." While these tests were chosen to show the ability of the thermoplastic polymer composition described herein to satisfy both the smoke generation and flammability requirements for aircraft interiors, the composition can advantageously comply with other related flammability and safety tests. Examples of other such tests can include, without limitation, other tests from FR-One, an international flame retardant fabric standard, such as NF-P-92-504, the tests described in 14 CFR 25.853 Appendix F, aircraft manufacturer tests, such as the Airbus ABD0031 test, and the like.

In one embodiment, a thermoplastic polymer composition comprises: a cyanophenyl endcapped polycarbonate; an aromatic sulphone sulphonate; and a brominated polycarbonate; wherein the composition, when in the form of a 3 mm extruded sheet, passes both a smoke density test as set forth in ASTM E662-06 and a flammability test as set forth in NF-P-92-505. An example of an aromatic sulphone sulphonate is potassium diphenyl sulphon-3-sulphonate.

The aromatic sulphone sulphonate can be present in an amount of 0.01 weight percent (wt. %) to 0.6 wt. %, based on the total weight of the thermoplastic polymer composition, specifically, in an amount of 0.1 wt. % to 0.4 wt. %, based on the total weight of the composition, more specifically, in an amount of 0.25 wt. % to 0.35 wt. %, based on the total weight of the composition. In addition, or alternatively, the brominated polycarbonate can comprise 24 wt. % to 28 wt. % bromine, based on the total weight of the brominated polycarbonate. The brominated polycarbonate can be present in an amount of 1 wt. % to 20 wt. %, based on the total weight of the thermoplastic polymer composition, specifically, 2 wt. % to 15 wt. %, more specifically, 4 wt. % to 12 wt. %.

The cyanophenyl endcapped polycarbonate can be a polycarbonate having repeating structural carbonate units of the formula (1):

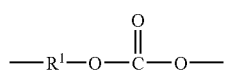

(1)

wherein at least 60 percent of the total number of $R^1$ groups contain aromatic organic groups and the balance thereof are aliphatic, alicyclic, or aromatic groups; and wherein the polycarbonate comprises cyanophenyl carbonate endcapping groups derived from reaction with a cyanophenol of the formula (2):

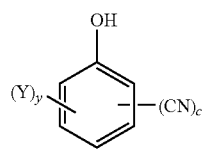

(2)

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5. The cyanophenyl endcapping groups can be present in an amount of 1 to 9 cyanophenyl carbonate units per 100 $R^1$ units. Examples of cyanophenols are p-cyanophenol, 3,4-dicyanophenol, or a combination comprising at least one of the foregoing cyanophenols.

In another embodiment, the cyanophenyl endcapped polycarbonate comprises a branching agent. Branching agents include polyfunctional organic compounds containing at least three functional groups selected from hydroxyl, carboxyl, carboxylic anhydride, haloformyl, and a combination comprising at least one of the foregoing functional groups. In another embodiment, the thermoplastic polymer composition can comprise 0.01 wt. % to 0.6 wt. % of the aromatic sulphone sulphonate, the brominated polycarbonate in an amount such that the composition comprises 0.26 wt. % to 5.2 wt. % bromine, optionally 0.26 wt. % to 3.1 wt. % bromine, and the balance cyanophenyl endcapped polycarbonate.

The thermoplastic polymer composition can be employed in a variety of aircraft interior components, as well as in interior components for other modes of transportation, such as bus, train, subway, and the like. Examples of interior components include a partition wall, cabinet wall, sidewall panel, ceiling panel, floor panel, equipment panel, light panel, window molding, window slide, storage compartment, galley surface, equipment housing, seat housing, speaker housing, duct housing, storage housing, shelf, tray, or a combination comprising at least one of the foregoing.

Again, the thermoplastic polymer composition described herein comprises a cyanophenyl endcapped polycarbonate, a brominated polycarbonate, and an aromatic sulphone sulphonate (e.g., KSS). The cyanophenyl carbonate endcapping groups, the brominated polycarbonate, and the aromatic sulphone sulphonate can be present in any amount effective to satisfy both the drip test and the smoke density test. Exemplary concentrations of each component in the thermoplastic polymer composition are discussed in detail below.

The thermoplastic polymer composition comprising the cyanophenyl endcapped polycarbonate can be used to form a sheet having improved flame retardant properties, e.g., compared to current sheets comprising phenol or para-cumyl-phenol endcapped polycarbonates. Specifically, the thermoplastic polymer composition provides a sheet that passes the smoke density test, even when the composition includes greater than 10 percent by weight (wt. %) of brominated polycarbonate, while greater than or equal to 8 wt. % brominated polycarbonate in other compositions fails the smoke density test. Polycarbonates endcapped with a cyanophenyl carbonate groups (for convenience herein, "cyanophenyl endcapped polycarbonates") have repeating structural carbonate units of the formula (1) wherein at least 60 percent of the total number of $R^1$ groups contains aromatic organic groups and the balance thereof are aliphatic, alicyclic, or aromatic groups. In one embodiment, each $R^1$ group is a divalent aromatic group, for example derived from an aromatic dihydroxy compound of the formula (4):

$$HO-A^1-Y^1-A^2-OH \qquad (4)$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (4) are bisphenol compounds of general formula (5):

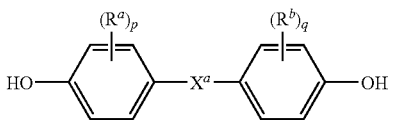

(5)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (6) or (7):

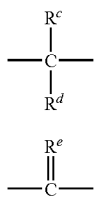

(6)

(7)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each hydrogen or the same $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (8):

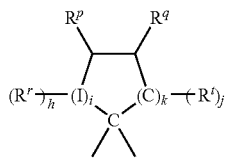

(8)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (8) will have an unsaturated carbon-carbon linkage where the ring is fused. When k is 1 and i is 0, the ring as shown in formula (8) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (9):

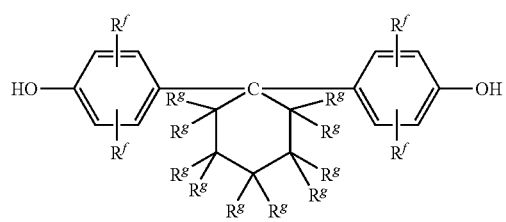

(9)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds include aromatic dihydroxy compounds of formula (10)

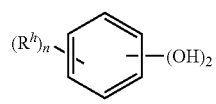

(10)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (4) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl) butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as ester units. In one specific embodiment, the polycarbonate is a linear or branched homopolymer or a linear or branched copolymer comprising units derived from bisphenol A, in which each of $A^1$ and $A^2$ is p-phenylene and $Y^1$ is isopropylidene in formula (4). More specifically, at least 60%, particularly at least 80% of the $R^1$ groups in the polycarbonate are derived from bisphenol A.

Another specific type of copolymer is a polyester carbonate, also known as a polyester-polycarbonate. Such copolymers further contain, in addition to recurring carbonate chain units of the formula (1), repeating units of formula (11):

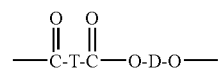
(11)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (5) above. In another embodiment, D is derived from an aromatic dihydroxy compound of formula (10) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations comprising at least one of the foregoing. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination comprising at least one of the foregoing. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the composition.

In a specific embodiment, the polyester unit of a polyester-polycarbonate can be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

A specific example of a polycarbonate-polyester is a copolycarbonate-polyester-polysiloxane terpolymer comprising carbonate units of formula (1), ester units of formula (11), and polysiloxane (also referred to herein as "polydiorganosiloxane") units of formula (12):

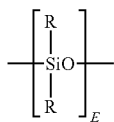
(12)

wherein each occurrence of R is same or different, and is a $C_{1-13}$ monovalent organic group. For example, R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. Combinations of the foregoing R groups can be used in the same copolymer. In an embodiment, the polysiloxane comprises R groups that have minimum hydrocarbon content. In a specific embodiment, an R group with minimum hydrocarbon content is a methyl group.

The value of E in formula (12) can vary widely depending on the type and relative amount of each component in the thermoplastic polymer composition, the desired properties of the composition, and like considerations. Herein, E has an average value of 4 to 50. In an embodiment, E has an average value of 16 to 50, specifically 20 to 45, and more specifically 25 to 45. In another embodiment, E has an average value of 4 to 15, specifically 5 to 15, more specifically 6 to 15, and still more specifically 7 to 12.

In an embodiment, polydiorganosiloxane units are derived from dihydroxy polysiloxanes of formula (13):

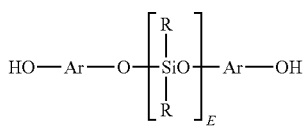
(13)

wherein E is as defined above; each R can independently be the same or different, and is as defined above; and each Ar can independently be the same or different, and is a substituted or unsubstituted $C_{6-30}$ arylene group, wherein the bonds are directly connected to an aromatic moiety. Suitable Ar groups in formula (13) can be derived from a $C_{6-30}$ dihydroxy aromatic compound, for example a dihydroxy aromatic compound of formula (4), (5), (9), or (10) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl) butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the dihydroxy aromatic compound is unsubstituted, or is not substituted with non-aromatic hydrocarbon-containing substituents such as, for example, alkyl, alkoxy, or alkylene substituents.

In a specific embodiment, where Ar is derived from resorcinol, the polydiorganosiloxane repeating units are derived from dihydroxy aromatic compounds of formula (14):

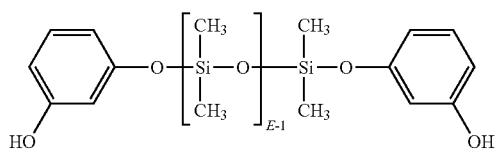
(14)

or, where Ar is derived from bisphenol A, from dihydroxy aromatic compounds of formula (15):

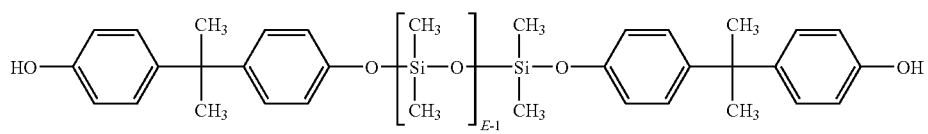
(15)

wherein E is as defined above.

In another embodiment, polydiorganosiloxane units are derived from dihydroxy polysiloxanes of formula (16):

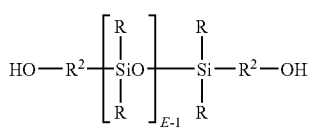
(16)

wherein R and E are as described above, and each occurrence of $R^2$ is independently a divalent $C_{1-30}$ alkylene or $C_{7-30}$ arylene-alkylene. In a specific embodiment, where $R^2$ is a $C_{7-30}$ arylene-alkylene, the polydiorganosiloxane units are derived from dihydroxy aromatic compound of formula (17):

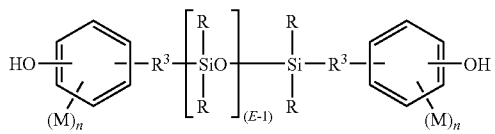
(17)

wherein R and E are as defined above. Each $R^3$ is independently a divalent $C_{2-8}$ aliphatic group. Each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polydiorganosiloxane units are derived from a dihydroxy aromatic compound of formula (18):

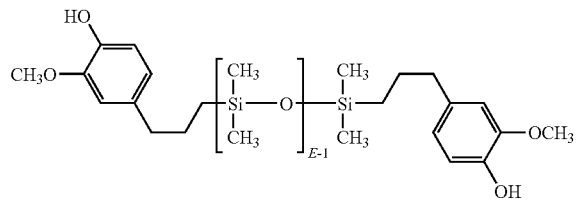

(18)

wherein E is as described above.

In another specific embodiment, the polydiorganosiloxane units are derived from dihydroxy aromatic compound of formula (19):

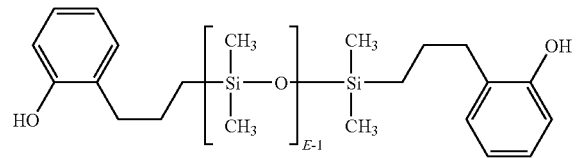

(19)

wherein E is as defined above.

Dihydroxy polysiloxanes of (13) can be formed from an alpha,omega-bisacetoxypolydiorganosiloxane and a dihydroxy aromatic compound under phase transfer conditions. Dihydroxy polysiloxanes of formula (16) can be formed by functionalizing a substituted siloxane oligomer of formula (20)

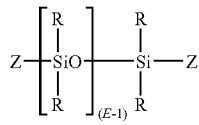

(20)

wherein R and E are as previously defined, and Z is H, halogen (Cl, Br, I), or carboxylate. Exemplary carboxylates include acetate, formate, benzoate, and the like. In an exemplary embodiment, where Z is H, compounds of formula (20) can be prepared by platinum catalyzed addition with an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing can also be used. Where Z is halogen or carboxylate, functionalization can be accomplished by reaction with a dihydroxy aromatic compound of formulas (4), (5), (9), (10), or a combination comprising at least one of the foregoing dihydroxy aromatic compounds.

Specific copolycarbonate terpolymers include those with polycarbonate units of formula (1) wherein $R^1$ is a $C_{6-30}$ arylene group, polysiloxane units derived from siloxane diols of formula (15), (18) or (19), and polyester units wherein T is a $C_{6-30}$ arylene group. In an embodiment, T is derived from isophthalic and/or terephthalic acid, or reactive chemical equivalents thereof. In another embodiment, $R^1$ is derived from the carbonate reaction product of a resorcinol of formula (10), or a combination of a resorcinol of formula (10) and a bisphenol of formula (5).

The relative amount of each type of unit in the foregoing terpolymer will depend on the desired properties of the terpolymer, and are readily determined by one of ordinary skill in the art without undue experimentation, using the guidelines provided herein. For example, the polycarbonate-polyester-polysiloxane terpolymer can comprise siloxane units in an amount of 0.1 to 25 weight percent (wt. %), specifically 0.2 to 10 wt. %, more specifically 0.2 to 6 wt. %, even more specifically 0.2 to 5 wt. %, and still more specifically 0.25 to 2 wt. %, based on the total weight of the polycarbonate-polyester-polysiloxane terpolymer, with the proviso that the siloxane units are provided by polysiloxane units covalently bonded in the polymer backbone of the polycarbonate-polyester-polysiloxane terpolymer. The polycarbonate-polyester-polysiloxane terpolymer can further comprise 0.1 to 49.85 wt. % carbonate units, 50 to 99.7 wt. % ester units, and 0.2 to 6 wt. % polysiloxane units, based on the total weight of the polysiloxane units, ester units, and carbonate units. Alternatively, the polycarbonate-polyester-polysiloxane terpolymer comprises 0.25 to 2 wt. % polysiloxane units, 60 to 96.75 wt. % ester units, and 3.25 to 39.75 wt. % carbonate units, based on the total weight of the polysiloxane units, ester units, and carbonate units.

Cyanophenyl endcapped polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Alternatively, melt processes can be used to make the cyanophenol endcapped polycarbonates. Generally, in the melt polymerization process, cyanophenol endcapped polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl) carboxylate, or a combination comprising at least one of the foregoing. Useful transesterification catalysts are of formula $(R^3)_4Q^+X$ above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

In a specific embodiment, a branched cyanophenyl endcapped polycarbonate is used, or a combination comprising a linear cyanophenyl endcapped polycarbonate and a branched cyanophenyl endcapped polycarbonate. Branched cyanophenyl endcapped polycarbonates contain branched blocks and have statistically more than two end groups. Branched polycarbonate blocks can be prepared by adding a branching agent during polymerization. In some embodiments, a particular type of branching agent is used to create branched cyanophenyl endcapped polycarbonate. The branching agent is added in an amount (relative to the bisphenol monomer) that is sufficient to achieve the desired branching content, that is, more than two end groups. In some embodiments, a combination of two or more branching agents can be used.

Branching agents include polyfunctional organic compounds containing at least three functional groups selected from hydroxyl, carboxyl, carboxylic anhydride, haloformyl, and a combination comprising at least one of the foregoing functional groups. In one embodiment, the branching agent is a triacid trichloride of formula (21):

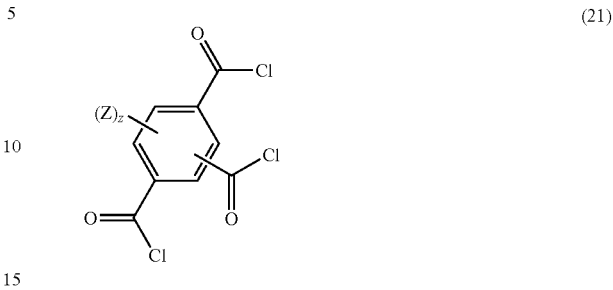

wherein each Z is independently a hydrogen, halogen, $C_{1-3}$ alkyl group, $C_{1-3}$ alkoxy group, $C_{7-12}$ arylalkyl, alkylaryl, or nitro group, and z is 0 to 3. In another embodiment, the branching agent is a tri-substituted phenol of formula (22):

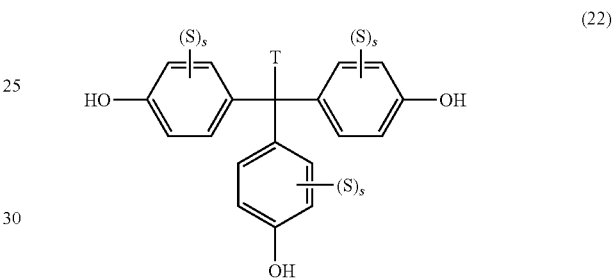

wherein T is a $C_{1-20}$ alkyl group, $C_{1-20}$ alkyleneoxy group, $C_{7-12}$ arylalkyl group, or alkylaryl group, each S is independently a hydrogen, halogen, $C_{1-3}$ alkyl group, $C_{1-3}$ alkoxy group, $C_{7-12}$ arylalkyl, alkylaryl, or nitro group, and each s is independently 0 to 4. In another embodiment, the branching agent is a benzimidazole of formula (23):

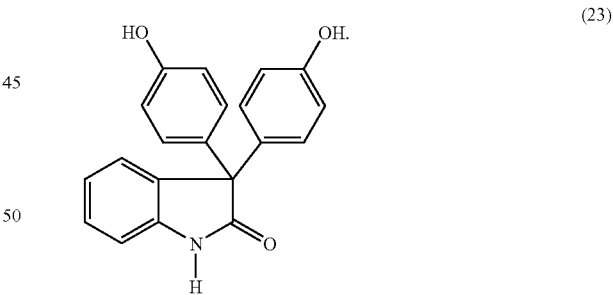

Specific examples of branching agents are trimellitic acid, trimellitic anhydride, trimellitic trichloride, tris-(p-hydroxyphenyl)ethane (THPE), isatin-bis-phenol (formula (23)), tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid, a combination comprising one or more of the foregoing branching agents can be used. THPE is a specific exemplary branching agent.

The relative amount of branching agents used in the manufacture of the cyanophenyl endcapped polycarbonate will depend on a number of considerations, for example the type of $R^1$ groups, the amount of cyanophenol, and the desired molecular weight. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 $R^1$ units. For branching agents having formula (21) or (22), the amount of branching agent is effective to provide about 0.1 to 10 branching units per 100 $R^1$ units, specifically about 0.5 to 8 branching units per 100 $R^1$ units. Most specifically the amount of branching agent is effective to provide about 0.75 to 5 tri-ester units per 100 $R^1$ units for branching agents of formula (21), and about 2.5 to 3.5 triphenylcarbonate units per 100 $R^1$ units for branching agents of formula (22).

The cyanophenols can be added to the polymerization reaction as an endcapping agent using conventionally known processes. In one embodiment it is advantageous to decrease, minimize, or prevent contact between the cyanophenol and components that result in cyanophenol byproducts, in particular the corresponding carboxylic acids and/or amides. For example, it is common to add endcapping agents as part of a warm aqueous solution of a caustic (i.e., alkali and alkaline earth metal hydroxides such as sodium hydroxide dissolved in water). If such contact occurs, side products can form, such as the corresponding hydroxybenzamide and/or hydroxybenzoic acid. Such side products tend to be insoluble or otherwise incompatible with the interfacial reaction, and can also cause error in obtaining the target molecular weight of the polycarbonate.

It has accordingly been found useful to modify the reaction conditions employed to produce the cyanophenyl endcapped polycarbonates so as to use cyanophenols that are essentially free of acid and amide groups. As used herein, "essentially free of" acid and amide groups means that the total number of acid and amide end groups are less than that detectable by Fourier transform infrared (FT-IR) analysis of the cyanophenol prior to addition to the polycarbonate reaction. Addition of the cyanophenol as a component in a warm aqueous solution of caustic is therefore to be avoided.

Other endcapping agents can also be used with cyanophenols, provided that such agents do not significantly adversely affect the desired properties of the thermoplastic polymer compositions, such as transparency, ductility, flame retardance, and the like. In one embodiment only a cyanophenol, specifically p-cyanophenol, is used as an endcapping agent. Exemplary additional chain stoppers include certain other mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used with cyanophenols as chain stopping agents. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations comprising at least one of the foregoing; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations comprising at least one of the foregoing.

The relative amount of cyanophenol used in the manufacture of the cyanophenyl endcapped polycarbonate will depend on a number of considerations, for example the type of $R^1$ groups, the use of a branching agent, and the desired molecular weight of the polycarbonate. In general, the amount of cyanophenol is effective to provide 1 to 9 cyanophenyl carbonate units per 100 $R^1$ units, specifically 2 to 8 cyanophenyl carbonate units per 100 $R^1$ units, and more specifically 2.5 to 7 cyanophenyl carbonate units per 100 $R^1$ units.

The molecular weight of the polymer can become very high upon addition of the branching agent, which can lead to viscosity problems during phosgenation. Therefore, when a branching agent is present, an increase in the amount of the cyanophenol is used in the polymerization. When a branching agent is present, the amount of cyanophenol is effective to provide 1 to 20 cyanophenyl carbonate units per 100 $R^1$ units, specifically 3 to 15 cyanophenyl carbonate units per 100 $R^1$ units, and more specifically 7 to 11 cyanophenyl carbonate units per 100 $R^1$ units.

The cyanophenyl endcapped polycarbonate, can have a weight average molecular weight (Mw) of 5,000 to 200,000, specifically 10,000 to 100,000 grams per mole (g/mol), even more specifically 15,000 to 60,000 g/mol, still more specifically 25,000 to 35,000 g/mol, as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min.

Melt volume flow rate (often abbreviated "MVR") measures the rate of extrusion of a thermoplastic through an orifice at a prescribed temperature and load. The cyanophenyl endcapped polycarbonate can have an MVR, measured at 300° C. under a load of 1.2 kg, of 0.1 to 200 cubic centimeters per 10 minutes ($cm^3$/10 min), specifically 1 to 100 $cm^3$/10 min.

In a specific embodiment, the cyanophenyl endcapped polycarbonate, specifically a branched cyanophenyl endcapped polycarbonate, comprises about 2.5 to 3.5 THPE units and about 7 to 11 cyanophenyl carbonate units per 100 $R^1$ units, and has a weight average molecular weight of about 25,000 to 35,000 g/L as measured by GPC.

The aromatic sulphone sulphonate can comprise a compound of formula (K-1):

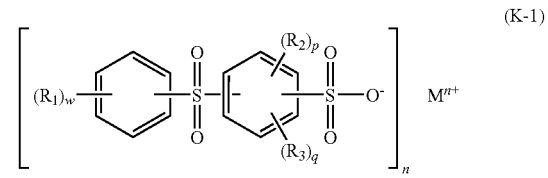

wherein $R_1$, $R_2$, and $R_3$ are each independently selected from a $C_1$-$C_6$ alkyl group such as methyl and ethyl; M is a metal (e.g., an alkali metal such as sodium, potassium, or the like); n is an integer and $1 \leq n \leq 3$; w is an integer and $0 \leq w \leq 5$; p and q are integers, $p \geq 0$, $q \geq 10$, and $p+q \leq 4$.

For example, in formula (K-1), M can be potassium, n=1, and w=p=q=0. The aromatic sulfonate is therefore potassium diphenylsulphone sulphonate (KSS) of formula (K-2):

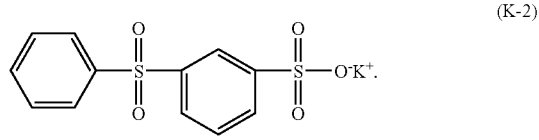

(K-2)

The aromatic sulphone sulphonate (e.g., KSS) is present in the thermoplastic polymer composition in quantities effective to achieve the requirements for use in aircraft compartment interiors. Suitable amounts of the aromatic sulphone sulphonate will vary, and can depend on, for example, the desired flame retardance, the amount of cyanophenyl endcapped polycarbonate present, and the amount of the brominated polycarbonate included in the thermoplastic polymer composition. Exemplary amounts of aromatic sulphone sulphonate present in the thermoplastic polymer composition can be 0.01 percent by weight (wt. %) to 0.6 wt. %, specifically 0.1 wt. % to 0.4 wt. %, and more specifically 0.25 wt. % to 0.35 wt. % (e.g., 0.3 wt. %), based on the total weight of the thermoplastic polymer composition.

The thermoplastic polymer composition herein further comprises brominated polycarbonate to aid in achieving the desired flammability properties for a sheet made of the composition for use in aircraft interiors. The brominated polycarbonate can be present in the thermoplastic polymer composition in an amount effective to satisfy the flammability test, without negatively impacting the smoke density test. Brominated polycarbonate concentrations can depend on, for example, the desired flame retardance and smoke generation properties of the thermoplastic polymer composition, the amount of cyanophenyl endcapped polycarbonate, present, and the amount of the aromatic sulphone sulphonate included in the composition.

In an exemplary embodiment, the brominated polycarbonate has a bromine content of 24 wt. % to 28 wt. % (e.g., 26 wt. %). Exemplary amounts of brominated polycarbonate, containing 26 wt. % bromine, in the thermoplastic polymer composition can be 1 wt. % to 20 wt. %, specifically 2 wt. % to 15 wt. %, and more specifically 4 wt. % to 12 wt. %, based on the total weight of the composition. In other words, the thermoplastic polymer composition can comprise 0.26 wt. % to 5.2 wt. %, specifically 0.52 wt. % to 3.9 wt. %, and more specifically 1.04 wt. % to 3.1 wt. % bromine, based on the total weight of the composition. In an alternative embodiment, any of the thermoplastic polymer compositions can comprise 0.26 wt. % to 3.1 wt. % bromine.

The brominated polycarbonates present in the thermoplastic polymer composition can be a high molecular weight, flame retardant, thermoplastic, aromatic polymer having a weight average molecular weight (Mw) of 8,000 to more than 200,000 atomic mass units (AMU), specifically of 20,000 to 80,000 AMU, and an intrinsic viscosity of 0.40 to 1.0 dl/g as measured in methylene chloride at 25° C. The brominated polycarbonate can be branched or unbranched.

In an exemplary embodiment, the brominated polycarbonate is derived from brominated dihydric phenols and carbonate precursors. Alternatively, the brominated polycarbonate can be derived from a carbonate precursor and a mixture of brominated and non-brominated aromatic dihydric phenols. Flame retardant brominated polycarbonates are disclosed, for example, in U.S. Pat. Nos. 4,923,933, 4,170,711, and 3,929,908.

Exemplary brominated dihydric phenols include 2,2-bis(3,5-dibromo-4-hydroxyphenyl)propane and 2,2',6,6'-tetramethyl-3,3',5,5'-tetrabromo-4,4'-biphenol. Exemplary non-brominated dihydric phenols for mixing with brominated dihydric phenols to produce brominated polycarbonates include, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, and (3,3'-dichloro-4,4'-dihydroxydiphenyl)methane. Mixtures of two or more different brominated and non-brominated dihydric phenols can be used. Branched brominated polycarbonates can also be used, as can blends of a linear brominated polycarbonate and a branched brominated polycarbonate.

The carbonate precursor can be a carbonyl halide. The carbonyl halides that can be used are carbonyl bromide, carbonyl chloride, and mixtures thereof.

The brominated polycarbonates used in the thermoplastic polymer composition can be manufactured according to procedures known in the art, such as, for example, by reacting a brominated dihydric phenol, or a mixture of brominated dihydric phenol and a non-brominated dihydric phenol, with a carbonate precursor such as diphenyl carbonate or phosgene in accordance with the methods set forth, for example, in U.S. Pat. Nos. 4,081,750 and 4,123,436. If a mixture of dihydric phenols is used, then exemplary mixtures contain greater than or equal to 25 percent of a brominated dihydric phenol, specifically 25 to 55 mole percent of a brominated dihydric phenol so as to render a flame retardant brominated polycarbonate. In an exemplary embodiment, the brominated polycarbonate is derived from a dihydric phenol composition containing 25 to 35 mole percent of a brominated dihydric phenol and 75 to 65 mole percent of a non-brominated dihydric phenol.

Aromatic brominated polycarbonates can be prepared by using a monofunctional molecular weight regulator, an acid acceptor and a catalyst, along with the brominated polycarbonate bisphenol. The molecular weight regulators that can be used include phenol, alkylated phenols such as 4-(1,1,3,3-tetramethylbutyl)phenol, para-tertiary-butyl-phenol, 4-cumyl phenol, and the like. In an exemplary embodiment, phenol or an alkylated phenol is used as the molecular weight regulator.

The acid acceptor can be either an organic or an inorganic acid acceptor. An exemplary organic acid acceptor is a tertiary amine and can include such materials as pyridine, triethylamine, dimethylaniline, tributylamine, and the like. The inorganic acid acceptor can be a hydroxide, a carbonate, a bicarbonate, or a phosphate of an alkali or alkaline earth metal.

The catalysts that can be used are those that can aid the polymerization of the monomer with phosgene. Exemplary catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride, and quaternary phosphonium compounds such as, for example, n-butyltriphenyl phosphonium bromide, and methyltriphenyl phosphonium bromide.

The brominated polycarbonate and the aromatic sulphone sulphonate flame retardant are added to the cyanophenyl end-capped to form the thermoplastic polymer composition. In another embodiment, the thermoplastic polymer composition further comprises a polycarbonate lacking cyanophenyl end-capping groups. In some interior compartment applications, it is desirable for the sheet to have certain optical properties. For example, it can be desirable to have a transparent sheet. With regards to the transparency of the sheet, it is briefly noted that end user specifications (e.g., commercial airline specifications) generally specify that the component satisfy a particular predetermined threshold. Haze values, as measured by ANSI/ASTM D1003-00, Procedure A, illuminant C, can be a useful determination of the optical properties of the transparent sheet. The lower the haze levels, the better the transparency of the sheet. Exemplary haze levels for the transparent sheet described herein, when measured at a thickness of 3.2 millimeters (mm), can be 0% to 6%, specifically 0.5% to 4%, and more specifically 0.5% to 2.5%. It is further noted that the transparency, when measured at a thickness of 3.2 mm, can be greater than or equal to 60%, specifically, greater than or equal to 80%, more specifically, greater than or equal to 85%, as measured in accordance with ASTM D1003-00, Procedure A, illuminant C.

Methods for forming the thermoplastic polymer composition can vary. In one embodiment, the brominated polycarbonate, the cyanophenyl endcapped polycarbonate, and the aromatic sulphone sulphonate (e.g., KSS), are blended, for example, in a screw-type extruder.

In another embodiment, the brominated polycarbonate, the cyanophenyl endcapped polycarbonate, and the aromatic sulphone sulphonate (e.g., KSS), are blended with a polycarbonate lacking cyanophenyl endcapping, for example, in a screw-type extruder.

The components can be combined in any form, for example, powder, granular, filamentous, and the like. The thermoplastic polymer composition blend can then be extruded and pelletized. The pellets can be suitable for molding into thermoplastic interior parts, or they can be used in forming a sheet of the thermoplastic polymer composition. In some embodiments, the thermoplastic polymer composition can be extruded (or co-extruded with a coating or other layer) in the form of a sheet and/or can be processed through calendaring rolls to form a sheet.

The disclosure is further illustrated by the following Examples. It should be understood that the non-limiting examples are merely given for the purpose of illustration. Unless otherwise indicated, all parts and percentages are by weight based upon the total weight of the thermoplastic polymer composition.

EXAMPLES

In the examples below, the following materials were used as set forth in Table 1.

TABLE 1

| Material name | Chemical name | Supplier |
| --- | --- | --- |
| PC-Br | Co-polymer of TBBPA (tetrabromo bisphenol acetone) and BPA containing 26 wt. % bromine with a melt flow of 5-8 g/10 minutes (ASTM D1238, 300° C., 2.16 kg) | SABIC Innovative Plastics |
| KSS | Potassium diphenyl sulphon-3-sulphonate | Arichem LLC |
| CFR PC | Branched cyanophenyl endcapped polycarbonate with a Mw of 30,000 g/mol (about 3.0 THPE units per 100 $R^1$ units) | SABIC Innovative Plastics |
| Linear PC | Linear polycarbonate with a wt. avg. MW of 30,000 (having an Intrinsic viscosity of 58.5) | SABIC Innovative Plastics |
| Low Flow PC | Low flow BPA polycarbonate resin made by an interfacial process with MW 62,000 measured on a polystyrene standard basis (Bisphenol A polycarbonate having a melt volume rate (MFR) of 5.1-6.9 grams/10 minutes measured at 300° C. and 1.2 kilograms load) | SABIC Innovative Plastics |
| High Flow PC | High flow BPA polycarbonate resin made by an interfacial process with MW 42,000 measured on a polystyrene standard basis (Bisphenol A polycarbonate having a melt flow rate (MFR) of 23.5-28.5 grams/10 minutes measured at 300° C. and 1.2 kilograms load) | SABIC Innovative Plastics |
| Rimar salt | Potassium perfluorobutane sulfonate | 3M |
| I-168 | Irgaphos ™ 168, tris(di-t-butylphenyl)phosphite (heat stabilizer) | Great Lakes |

Drip and smoke density tests were conducted for various combinations of the materials listed in Table 1. The results are set forth below for each of the example compositions. The various compositions were prepared by compounding on a Werner and Pfleider ZSK 25 millimeter (mm) intermeshing twin-screw extruder at 300 revolutions per minute (rpm) and at a throughput of 20 kilograms per hour (kg/hr) with a torque of 75%. The barrel temperature settings from feed throat toward the direction of the twin strand die were set at 40-150-250-285-300-300-300-300° C. respectively for each heating zone. The die temperature was set at 300° C. The polymer strand was cooled by a water bath prior to pelletization. The tests were conducted on 2 and 3 mm thick sheets of the thermoplastic polymer composition formed from the pellets. The sheets had dimensions of 75 mm×305 mm. The drip tests were conducted in accordance with FR-1 French Ministerial NF-P-92-505. The samples were tested both when cut in extrusion direction and in the cross extrusion direction, but no differences were seen. A successful drip test had no burning drips coming off the sheet sample for 10 minutes.

For each thermoplastic polymer composition, four different sheet samples were tested and the percentage of those that passed was reported in the tables below. The smoke density tests were conducted in accordance with ASTM E662-06/ IMO MC.41(64). For this test, measurement was made of the attenuation of a light beam by smoke (suspended solid or liquid particles) accumulating within a closed chamber due to non-flaming pyrolytic decomposition and flaming combustion. For the test, a 3-inch (7.6 cm) by 3-inch (7.6 cm) sample was mounted within an insulated ceramic tube with an electrically heated radiant-energy source mounted therein. To satisfy aircraft requirements, a successful smoke density test is below 200 at an exposure period of 240 seconds as measured by a photometric system. For each formulation, three different sheet samples were tested for smoke density, and the average smoke density was calculated. Those tests were reported in the tables below as well.

Various thermoplastic polymer compositions were formed into 3-mm thick sheets as described above and measured for flammability and smoke generation properties. Table 2 illustrates the test results of comparative compositions comprising linear polycarbonate currently used in flame retardant polycarbonate sheets for aircraft interiors.

increase in bromine content. Moreover, use of a different flame retardant salt, such as Rimar salt in Example 9, produced an even worse result in the smoke density test. So as can be seen from Comparative Examples 1-10, the combination of KSS in a standard linear polycarbonate was ineffective in satisfying both the drip test and the smoke density test, regardless of the bromine content included therein.

Examples 11-20 were sheets containing the cyanophenyl endcapped polycarbonate, with various amounts of the KSS and the brominated polycarbonate. Examples 11-17 with the cyanophenyl endcapped polycarbonate passed the smoke density test. And in Examples 14 and 17 in particular, the sheets passed both the smoke density test and the drip test. A 0.3 wt. % level of KSS was effective in passing the smoke density test, whether the sheet contained 6 wt. % or 12 wt. % brominated polycarbonate. Moreover, the combination of brominated polycarbonate, 0.3 wt. % KSS, and the balance cyanophenyl endcapped polycarbonate was successful in passing the drip test. Neither a lower weight percentage of KSS, nor the use of an alternative salt like Rimar salt in

TABLE 2

| Ex.* | I-168 (wt. %) | PC-Br (wt. %) | KSS (wt. %) | Rimar Salt (wt. %) | Linear PC (wt. %) | Smoke Density (avg) | Smoke Density (Pass/Fail) | Drip Test (% of passing samples) |
|---|---|---|---|---|---|---|---|---|
| 1 | 0.05 | — | 0.1 | — | 99.85 | 186 | PASS | 0 |
| 2 | 0.05 | 3.0 | 0.1 | — | 96.85 | 145 | PASS | 25 |
| 3 | 0.05 | 6.0 | 0.1 | — | 93.85 | 117 | PASS | 0 |
| 4 | 0.05 | 6.0 | 0.3 | — | 93.65 | 134 | PASS | 80 |
| 5 | 0.05 | 8.0 | 0.1 | — | 91.85 | 259 | FAIL | 25 |
| 6 | 0.05 | 12.0 | 0.1 | — | 87.85 | 244 | FAIL | 60 |
| 7 | 0.05 | 12.0 | 0.3 | — | 87.65 | 212 | FAIL | 60 |
| 8 | 0.05 | 12.0 | — | — | 87.95 | 318 | FAIL | 25 |
| 9 | 0.05 | 12.0 | — | 0.07 | 87.88 | 254 | FAIL | 100 |
| 10 | 0.05 | 24.0 | 0.1 | — | 75.85 | 316 | FAIL | 100 |

*Examples 1-10 are comparative

Table 3 illustrates test results for compositions including the cyanophenyl endcapped polycarbonate described herein.

combination with the brominated polycarbonate and the cyanophenol endcapped polycarbonate formed sheets that

TABLE 3

| Ex. | TDBPP (wt. %) | PC-Br (wt. %) | KSS (wt. %) | Rimar Salt (wt. %) | CFR PC (wt. %) | Smoke Density (avg) | Smoke Density (Pass/Fail) | Drip Test (% of passing samples) |
|---|---|---|---|---|---|---|---|---|
| 11 | 0.05 | — | 0.1 | — | 99.85 | 100 | PASS | 20 |
| 12 | 0.05 | 3.0 | 0.1 | — | 96.85 | 111 | PASS | 60 |
| 13 | 0.05 | 6.0 | 0.1 | — | 93.85 | 106 | PASS | 60 |
| 14 | 0.05 | 6.0 | 0.3 | — | 93.65 | 97 | PASS | 100 |
| 15 | 0.05 | 8.0 | 0.1 | — | 91.85 | 132 | PASS | 0 |
| 16 | 0.05 | 12.0 | 0.1 | — | 87.85 | 158 | PASS | 60 |
| 17 | 0.05 | 12.0 | 0.3 | — | 87.65 | 142 | PASS | 100 |
| 18 | 0.05 | 12.0 | — | — | 87.95 | 315 | FAIL | 60 |
| 19 | 0.05 | 12.0 | — | 0.07 | 87.88 | 207 | FAIL | 80 |
| 20 | 0.05 | 24.0 | 0.1 | — | 75.85 | 267 | FAIL | 100 |

Comparative Examples 1-10 were examples containing polycarbonate used in current flame retardant sheets, with various amounts of the flame retardant additives and brominated polycarbonate described above. Examples 1-4 passed the smoke density test, but failed the drip test—the KSS did not compensate for the low amounts of brominated polycarbonate. Examples 5-10 all failed the smoke density test, even though Examples 9 and 10 passed the drip test. Increases in the amounts of brominated polycarbonate caused the sheets to fail the smoke density test. The added KSS, when combined with the linear polycarbonate, was not effective to reduce the increase in smoke generation that resulted from the could pass both tests. As seen in Examples 19 and 20, even with the cyanophenyl endcapped polycarbonate and a substantial amount of brominated polycarbonate (up to 24 wt. %) present in the composition, the sheets failed at least the smoke density test. The cyanophenyl endcapped polycarbonate, therefore, is capable of forming a sheet suitable for aircraft interiors when it is combined with at least 6 wt. % of brominated polycarbonate, and greater than 0.1 wt. % of KSS.

Thermoplastic compositions containing the cyanophenyl endcapped polycarbonate as shown in Table 4 were further tested for optical properties. In addition, each of the compositions contained 0.05 parts per hundred parts of resin (phr) of octaphenylcyclotetrasiloxane, 0.08 phr of Rimar salt, 0.06 phr of 1-168, and 0.27 phr of PETS. The compositions were manufactured as described above, then molded into 3.2 mm thick disks for testing in accordance with ANSI/ASTM D1003-00, Procedure A, illuminant C.

TABLE 4

| CFR PC | Low Flow PC | High Flow PC | YI (3.2 mm) | Haze (3.2 mm) | Transmission (3.2 mm) |
|---|---|---|---|---|---|
| 25 | 75 | — | 2.5 | 1.1 | 88% |
| 50 | 50 | — | 3.2 | 1.6 | 88% |
| 35 | 16 | 49 | 3.2 | 0.66 | 88% |
| 35 | — | 65 | 3.6 | 0.81 | 88% |
| 50 | — | 50 | 3.7 | 0.78 | 88% |

As can be seen from the results in Table 4, each of the compositions has a YI of 2.5 or less, a % haze of less than 2.0, and a percent transmission of greater than 85%.

Advantageously, the thermoplastic polymer compositions herein comprise a cyanophenyl endcapped polycarbonate in combination with an optimal amount of aromatic sulphone sulphonate (e.g., KSS) and brominated polycarbonate. The thermoplastic polymer composition is capable of forming a sheet that is able to satisfy both the smoke and flammability requirements for use in aircraft interiors. By utilizing the cyanophenyl endcapped polycarbonate rather than the polycarbonates currently found in transparent flame retardant sheets, the sheet described herein is better able to satisfy the smoke density and flammability standards set for use in aircraft interiors. The unique combination of cyanophenyl endcapped polycarbonate with KSS and brominated polycarbonate forms a sheet capable of meeting stringent flame safety guidelines, while also being able to satisfy airline-specific smoke and toxicity, requirements.

Ranges disclosed herein are inclusive and combinable (e.g., ranges of "up to 25 wt. %, or, more specifically, 5 wt. % to 20 wt. %", is inclusive of the endpoints and all intermediate values of the ranges of "5 wt. % to 25 wt. %"). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sheet having a thickness of 2-3 mm, comprising a thermoplastic polymer composition, wherein the thermoplastic polymer composition comprises:
   a branched cyanophenyl endcapped polycarbonate having:
   repeating structural carbonate units of the formula:

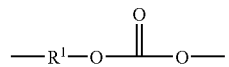

wherein at least 60 percent of the total number of $R^1$ groups contain aromatic organic groups and the balance thereof are aliphatic, alicyclic, or aromatic groups;
      branching groups derived from reaction with a branching agent; and
      cyanophenyl endcapping groups derived from reaction with a cyanophenol;
   0.01 wt. % to 0.6 wt. % of an aromatic sulphone sulphonate;
   a brominated polycarbonate, in an amount such that the composition comprises 0.26 wt. % to 5.2 wt. % bromine,
   wherein, said sheet has smoke density and flammability properties such that a 3 mm thick extruded sheet has a smoke density of less than 200 at an exposure period of 240 seconds in accordance with the smoke density test as set forth in ASTM E662-06, and has no burning drips on the sheet for a duration of 10 minutes in accordance with the flammability test as set forth in NF-P-92-505.

2. The sheet of claim 1, having a thickness of 3 mm.

3. An aircraft interior component comprising the sheet of claim 2.

4. The component of claim 3, in the form of a partition wall, cabinet wall, sidewall panel, ceiling panel, floor panel, equipment panel, light panel, window molding, window slide, storage compartment, galley surface, equipment housing, seat housing, speaker housing, duct housing, storage housing, shelf, tray, or a combination comprising at least one of the foregoing.

5. A method for the manufacture of a sheet having a thickness of 2-3 mm, comprising
   extruding a thermoplastic polymer composition, wherein the thermoplastic polymer composition comprises:
   a branched cyanophenyl endcapped polycarbonate having:
   repeating structural carbonate units of the formula:

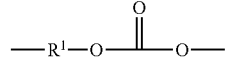

wherein at least 60 percent of the total number of $R^1$ groups contain aromatic organic groups and the balance thereof are aliphatic, alicyclic, or aromatic groups;

branching groups derived from reaction with a branching agent; and cyanophenyl endcapping groups derived from reaction with a cyanophenol;

0.01 wt. % to 0.6 wt. % of an aromatic sulphone sulphonate;

a brominated polycarbonate, in an amount such that the composition comprises 0.26 wt. % to 5.2 wt. % bromine;

wherein, said sheet has smoke density and flammability properties such that a 3 mm thick extruded sheet has a smoke density of less than 200 at an exposure period of 240 seconds in accordance with the smoke density test as set forth in ASTM E662-06, and has no burning drips on the sheet for a duration of 10 minutes in accordance with the flammability test as set forth in NF-P-92-505.

6. The method of claim 5, wherein the sheet has a thickness of 3 mm.

7. The sheet of claim 1, wherein the sheet has a percent transmission of greater than 85%, a % haze of less than 2.0 and a yellowness index of 2.5 YI units or less, when tested according to ANSI/ASTM D1003-00, Procedure A, illuminant C.

8. The sheet of claim 1, wherein the aromatic sulphone sulphonate is potassium diphenysulphone sulphonate, present in an amount from 0.25 to 0.35 wt. % based on the total weight of the thermoplastic polymer composition.

9. The sheet of claim 1, wherein the branching agent is a triacid trichloride of formula:

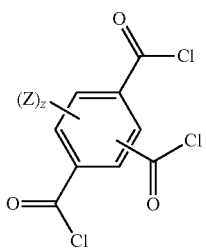

wherein each Z is independently a hydrogen, halogen, $C_{1-3}$ alkyl group, $C_{1-3}$ alkoxy group, $C_{7-12}$ arylalkyl, alkylaryl, or nitro group, and z is 0 to 3;

a tri-substituted phenol of formula:

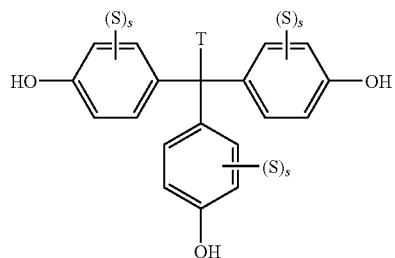

wherein T is a $C_{1-20}$ alkyl group, $C_{1-20}$ alkeneoxy group, $C_{7-12}$ arylalkyl group, or alkylaryl group, each S is independently a hydrogen, halogen, $C_{1-3}$ alkyl group, $C_{1-3}$ alkoxy group, $C_{7-12}$ arylalkyl, alkylaryl, or nitro group, and each s is independently 0 to 4;

a benzimidazole of formula:

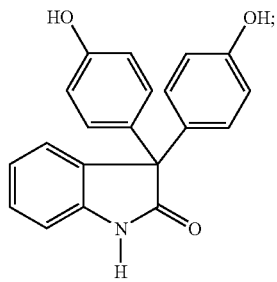 [SMILES: O=C1Nc2ccccc2C1(c1ccc(O)cc1)c1ccc(O)cc1]

or a combination comprising at least one of the foregoing branching agents, and further wherein the cyanophenol is of the formula:

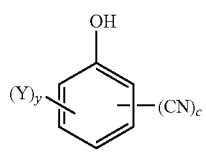

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5.

10. The sheet of claim 1, wherein the branching agent is trimellitic acid, trimellitic anhydride, trimellitic trichloride, tris-(p-hydroxyphenyl)ethane, isatin-bis-phenol, 1,3,5-tris((p-hydroxyphenyl)isopropyl)benzene), 4(4(1,1-bis(p-hydroxyphenyl)-ethyl) alpha,alpha-dimethyl benzyl)phenol), 4-chloroformyl phthalic anhydride, trimesic acid, benzophenone tetracarboxylic acid, or a combination comprising one or more of the foregoing branching agents.

11. The sheet of claim 1, wherein
the branching agent is trimellitic trichloride, tris-(p-hydroxyphenyl)ethane, or a combination comprising both of the foregoing branching agents, and
the cyanophenol is p-cyanophenol, 3,4-dicyanophenol, or a combination comprising both of the foregoing phenols.

12. The sheet of claim 1, wherein the branching groups are present in an amount of 0.1 to 10 branching units per 100 $R^1$ units, and the cyanophenyl endcapping groups are present in an amount of 1 to 20 cyanophenyl carbonate units per 100 $R^1$ units.

13. The sheet of claim 1, wherein the brominated polycarbonate is present in an amount such that the composition comprises 0.26 wt. % to 3.1 wt. % bromine.

14. The sheet of claim 1, wherein the branched cyanophenyl endcapped polycarbonate comprises about 2.5 to 3.5 tris-(p-hydroxyphenyl)ethane units and about 7 to 11 cyanophenyl carbonate units per 100 $R^1$ units, and has a weight average molecular weight of about 25,000 to 35,000 grams per mole as measured by gel permeation chromatography.

15. The sheet of claim 1, wherein the aromatic sulphone sulphonate comprises an alkali metal aromatic sulphone sulphonate.

16. The sheet of claim 1, wherein the alkali metal aromatic sulphone sulphonate comprises potassium diphenylsulphone sulphonate.

17. The sheet of claim 1, wherein the brominated polycarbonate comprises 24 wt. % to 28 wt. % bromine, based on the total weight of the brominated polycarbonate.

* * * * *